United States Patent

[11] 3,582,887

[72] Inventor John G. Guthrie
County of Montgomery, Md.
[21] Appl. No. 714,518
[22] Filed Mar. 20, 1968
[45] Patented June 1, 1971
[73] Assignee Farrington Electronics, Inc.
Springfield, Va.

[54] ADJUSTABLE CHARACTER READER TO COMPENSATE FOR VARYING PRINT DENSITY

6 Claims, 14 Drawing Figs.

[52] U.S. Cl. .......... 340/146.3
[51] Int. Cl. .......... G06k 9/10
[50] Field of Search .......... 340/146.3; 178/7.6

[56] References Cited

UNITED STATES PATENTS

| | | | |
|---|---|---|---|
| 3,104,372 | 9/1963 | Rabinow et al. | 340/146.3 |
| 3,466,603 | 9/1969 | Shelton, Jr. | 340/146.3 |
| 3,471,832 | 10/1969 | Pawletko | 340/146.3 |
| 3,479,642 | 11/1969 | Bartz | 340/146.3 |

*Primary Examiner*—Maynard R. Wilbur
*Assistant Examiner*—Leo H. Boudreau
*Attorney*—Gerald J. Ferguson, Jr.

ABSTRACT: A character reader is disclosed, the operation of which is adjustable to thereby compensate for varying print densities of the characters. The raw video pulses generated during the scanning of a character are applied to a plurality of video quantizers, the clipping levels of the quantizers respectively corresponding to different values of print density. The print density of the scanned character is determined by measuring the stroke width of the vertical lines of the characters, the stroke width, in turn, being measured by counting the number of successive scanning frames in which at least one short vertical segment occurs, the length of such segments exceeding some predetermined standard. A plurality of outputs are developed from the counter, the counter outputs respectively corresponding to the plurality of video quantizers whereby the energization of a selected one of the counter outputs will cause the corresponding video quantizer to be actuated and only that quantizer. The recognition circuitry operates only upon that video quantizer output selected by the point density measuring circuit.

INVENTOR
JOHN G. GUTHRIE
By Gerald J. Ferguson, Jr.
ATTORNEY

ADJUSTABLE CHARACTER READER TO COMPENSATE FOR VARYING PRINT DENSITY

BACKGROUND OF THE INVENTION

This invention relates to character readers and in particular to such readers, the operation of which may be adjusted to compensate for varying print densities.

Typically, in prior art character-reading devices, whenever an error occurs, the character is simply rescanned without any adjustment of the reader operation in the hope that the character will be successfully recognized on one of the subsequent rescans. Other prior art readers have recognized the desirability of building into the readers a degree of adaptability in order that varying degrees of print density may be compensated for. In other words, in journal tape applications for example, the print density on the first portion of the tape may be particularly heavy whereas toward the end of the tape the print density may be particularly light. Due to the design of the recognition circuitry such variations of print density may prevent the recognition logic circuitry from successfully performing its function. If such is the case, it is highly unlikely that a predetermined number of rescans of a character without any adjustment will overcome this problem.

As stated above, means have been employed in the prior art to provide character readers with some adaptability; however, they generally suffer either because of complexity and expense or because of inability to accurately determine and measure the print density whereby the circuitry can be adjusted.

SUMMARY OF THE INVENTION

It is thus a primary object of this invention to provide an improved character reader, the operation of which is adjustable to compensate for varying print densities, the adjustability being effectuated by means which are simple and inexpensive but yet which accurately measure the print density.

It is a further object of this invention to provide improved means for accurately measuring the print density of printed characters.

It is a further object of this invention to provide improved means for producing a plurality of quantizing levels in a character reader.

It is a further object of this invention to provide means for measuring the print density of a character by measuring the stroke widths of the character.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figure 1:
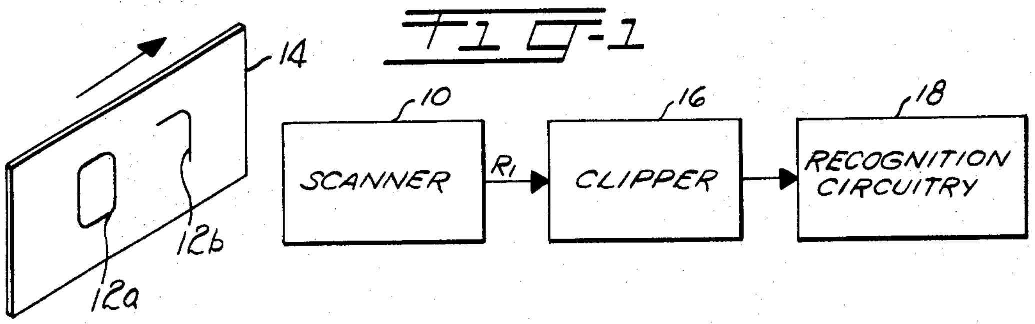
FIG. 1 is a block diagram of an overall character-reading system.
Figure 2A:
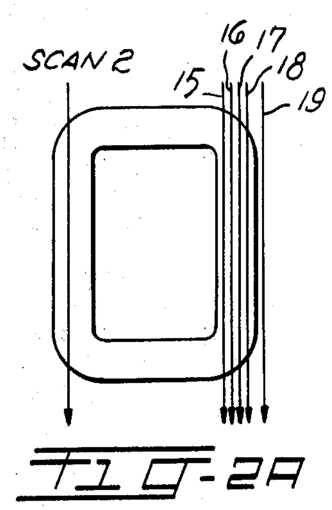
FIGS. 2A and 2B respectively illustrate (1) a numeral 0 of medium or normal print density and (2) the raw video pulse occuring on the second scan thereof.

Referring to FIG. 1, there is diagrammatically shown in block diagram form a character-reading system comprising a scanner 10 which scans printed characters 12*a* and 12*b* which are printed on a document 14. There is relative movement between the scanner and the document. Further, the scanner causes a scanning cell to move over each character area such that typically twenty vertical scanning frames, five of which are shown in FIG. 2A, that is, scans 2, 15, 16, 17, and 18. Of course, other scanning orientations, such as a horizontal scan may also be employed and still utilize the principles of this invention. Thus successive vertical slices of the characters 12*a* and 12*b* are imaged by the scanner and converted into raw video recognition pulses $R_1$ which are, in turn, applied to clipper 16, which produces quantized video pulses. The threshold level of the clipper determines whether a particular unit area of the character space is adjudicated black or white. The clipper output pulses are then applied to recognition circuitry 18 which is responsive to various combinations of input pulses to distinguish between the various characters of the font printed on the document 14. What has been described above with respect to FIG. 1 is well known and described in many prior art patents such as U.S. Pat. No. 2,897,481 granted to David H. Shepard and assigned to the assignee of the present application.

Figure 3A:
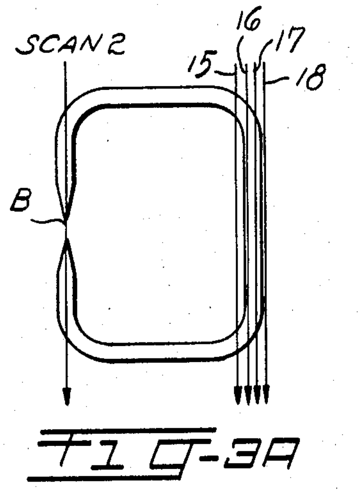
FIGS. 3A—3C respectively illustrate (1) a numeral 0 of low print density, (2) the raw video pulse resulting from the second scan thereof together with an illustration of the clipping level when set for medium print density, and (3) the video pulse resulting from the second scan thereof together with an adjusted clipping level to compensate for the low print density.

As shown in FIG. 1, the characters referenced 12*a* and 12*b* are numerals 0 and 7, respectively. These two particular numerals will be employed to illustrate the advantages of the invention. As stated hereinbefore, the basic purpose of this invention is to provide means within a character reader to compensate for varying degrees of print density, which in turn for the instant invention, is a function not only of the particular paper, ink and font utilized but also the scan density (that is, the number of scans per unit length of the document). Generally speaking, the greater the print density, the thicker the strokes comprising the character and vice versa. Referring to FIGS. 2A and 3A there are respectively shown a numeral 0 of normal or medium print density and a numeral 0 of low print density.

Figure 2B:
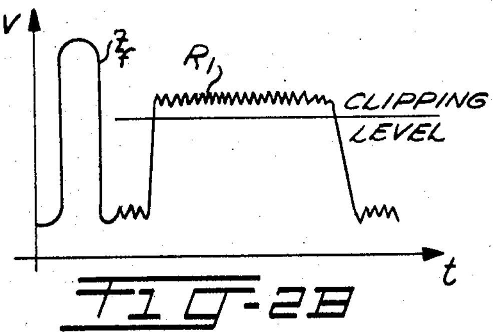

The recognition circuitry 18 of FIG. 1 relies, among other things, upon the presence of the long left vertical line of the numeral 0 to recognize it. Thus, during the second vertical scan of the numeral 2 (as indicated in FIG. 2A), a recognition pulse $R_1$ is generated at the output of scanner 10 as indicated in FIG. 2B. The pulse referenced as $Z_f$ occurs at the beginning of each scanning frame in a manner well known to those of ordinary skill in this art. The clipping level of clipper 16 of FIG. 1 is indicated in FIG. 2B. It can be seen that the output of the clipper (not shown) will be a square pulse the width of which corresponds to the long left vertical line of the numeral 0. Thus, the recognition circuitry 18 of FIG. 1 will include a pulse width measuring circuit (not shown) which provides an output signal whenever an input signal applied thereto exceeds in width the standard established for long vertical legs of the characters of a font. The signal of FIG. 2B is of such a width that it would energize the output of the above pulse width measuring circuit.

Figure 3B:
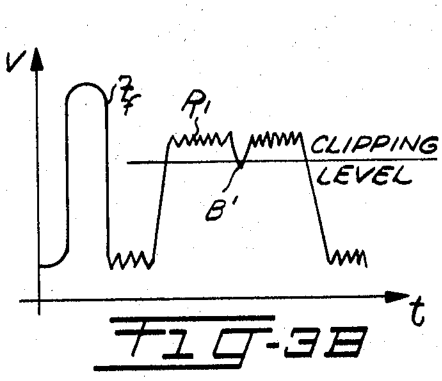
Figure 3C:
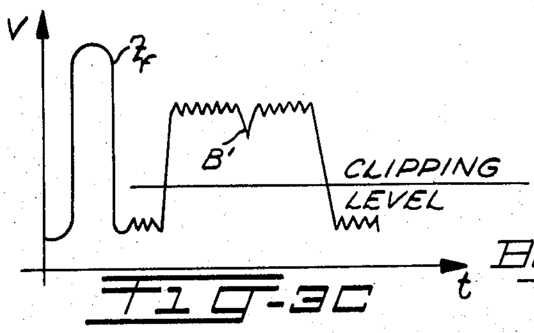

Referring to FIG. 3B there is shown the recognition pulse $R_1$ which results from the second scan of the low print density numeral 0 of FIG. 3A. Because of the low print density it should be noted that a break has occurred in the left vertical leg of the numeral indicated at B in FIG. 3A. The break B in turn causes the pip B′ in the recognition pulse $R_1$ of FIG. 3B. Thus, the output of clipper 16 will be two successive pulses, the pulse width of neither of them being of sufficient duration to energize the output of the above mentioned pulse width measuring circuit. Thus, the recognition logic will fail to detect the presence of the long vertical leg and thus fail to recognize the character 0 all together. To compensate for such failures, appropriate corrective action must be taken. Such action is indicated in FIG. 3C where the clipping level has been lowered below that indicated in FIG. 3B. Thus, as can be seen from FIG. 3C, the effect of the pip′ is obviated and a clipper output pulse is generated, the duration of which is of sufficient length to energize the above mentioned pulse width measuring circuit. As will be brought out in more detail hereinafter, appropriate circuitry for effectuating the above-desired result is described.

Figure 4A:
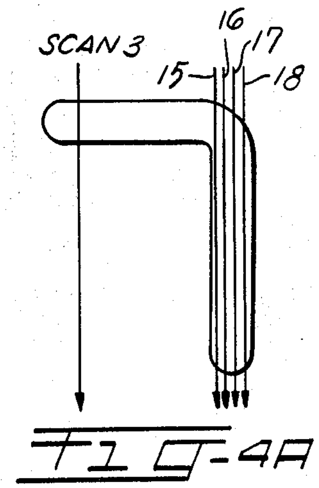
FIGS. 4A and 4B respectively illustrate (1) a numeral 7 of normal or medium print density and (2) the raw video pulse which results from the third scan thereof.
Figure 5A:
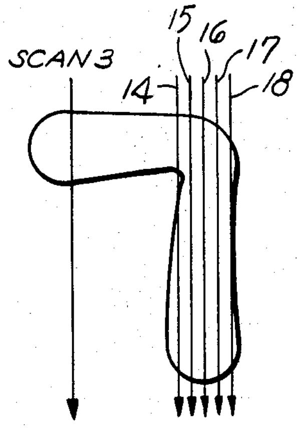
FIGS. 5A—5C respectively illustrate (1) a numeral 7 of heavy print density, (2) the raw video pulse which results from the third scan thereof together with a clipping level corresponding to medium print density, and (3) the video pulse resulting from the third scan thereof together with an adjusted clipping level corresponding to a heavy print density.
Figure 4B:
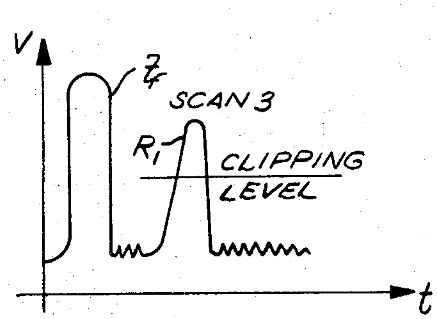

The above example, illustrated with respect to FIGS. 3A through 3C, illustrates how the clipping level is moved from a normal or medium level to a lower level in order to effectuate a desired compensation whenever the print density is substantially lower than normal. Before proceeding with a detailed description of the structure and operation of the preferred embodiment of the invention, reference should be made to FIGS. 4A and 4B and 5A—5C which illustrate one situation wherein the clipping level is shifted from its normal level to a higher level to thereby compensate for heavier than normal print density. In particular, FIG. 4A illustrates the numeral 7 printed with normal print density (that is, the stroke width is nominal) while FIG. 5A illustrates the same numeral printed with a heavy print density. In FIG. 4B there is shown the recognition pulse $R_1$ which results during scanning frame 3 for the numeral 7 of FIG. 4A while in FIG. 5B there is shown the recognition pulse $R_1$ which results for the numeral 7 of FIG. 5A. In order to understand how the heavily printed 7 of FIG. 5A will cause an error in the recognition circuitry, certain features of the recognition circuitry must be briefly described. In particular, certain components of the recognition circuitry are so designed as to measure the length of relatively short vertical strokes in the lefthand portion of the scanned character. Whenever the length of such strokes exceeds a predetermined standard corresponding to a short vertical stroke, it is assumed that this stroke corresponds to one of the strokes of one of the characters of the printed font. Of course, from the above discussion of how the character 7 is recognized, it is clear that the short vertical stroke must be at least greater than the nominal stroke width of the character to be recognized as is well known to those of ordinary skill in this art. Thus, the presence of a stroke, for example, in the upper left-hand portion of a character would possibly be one requirement for the numeral 4. However, such a stroke would clearly not be a requirement for the numeral 7. However, referring once again to FIG. 5A, it can be seen that the end of the upper horizontal stroke of the numeral 7 has been spread out to such an extent that the width of the recognition pulse $R_1$ at the clipping level (see FIG. 5B) is such that it could exceed the predetermined standard established for characterizing short vertical strokes. Assuming that this is the case with the numeral 7 of FIG. 5A, the recognition circuitry 18 will necessarily fail to recognize that the character of FIG. 5A is a 7.

Figure 5B:
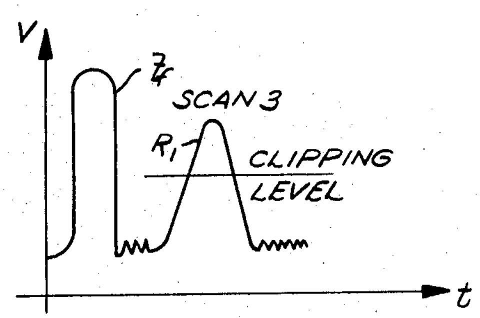
Figure 5C:
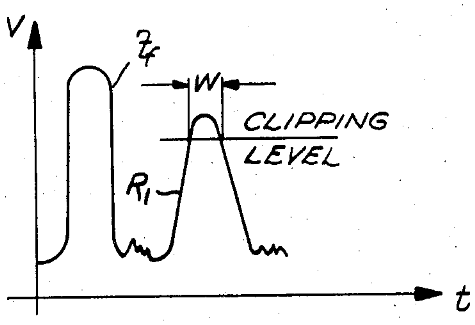

Referring to FIG. 5C, there is illustrated therein one procedure for adjusting the character reader of FIG. 1 to thereby compensate for the problem illustrated with respect to FIGS. 5A and 5B. In particular, the clipping level of FIG. 5C is raised with respect to that of FIG. 5B thereby causing the pulse width of the clipper output pulse to be narrowed to the width indicated as W in FIG. 5C. This pulse narrowing, in turn, prevents the pulse from actuating the pulse width measuring circuit which determines the presence of short vertical strokes as discussed above. Hence, an example has now been given where a heavier than normal print density is compensated for.

Figure 6:
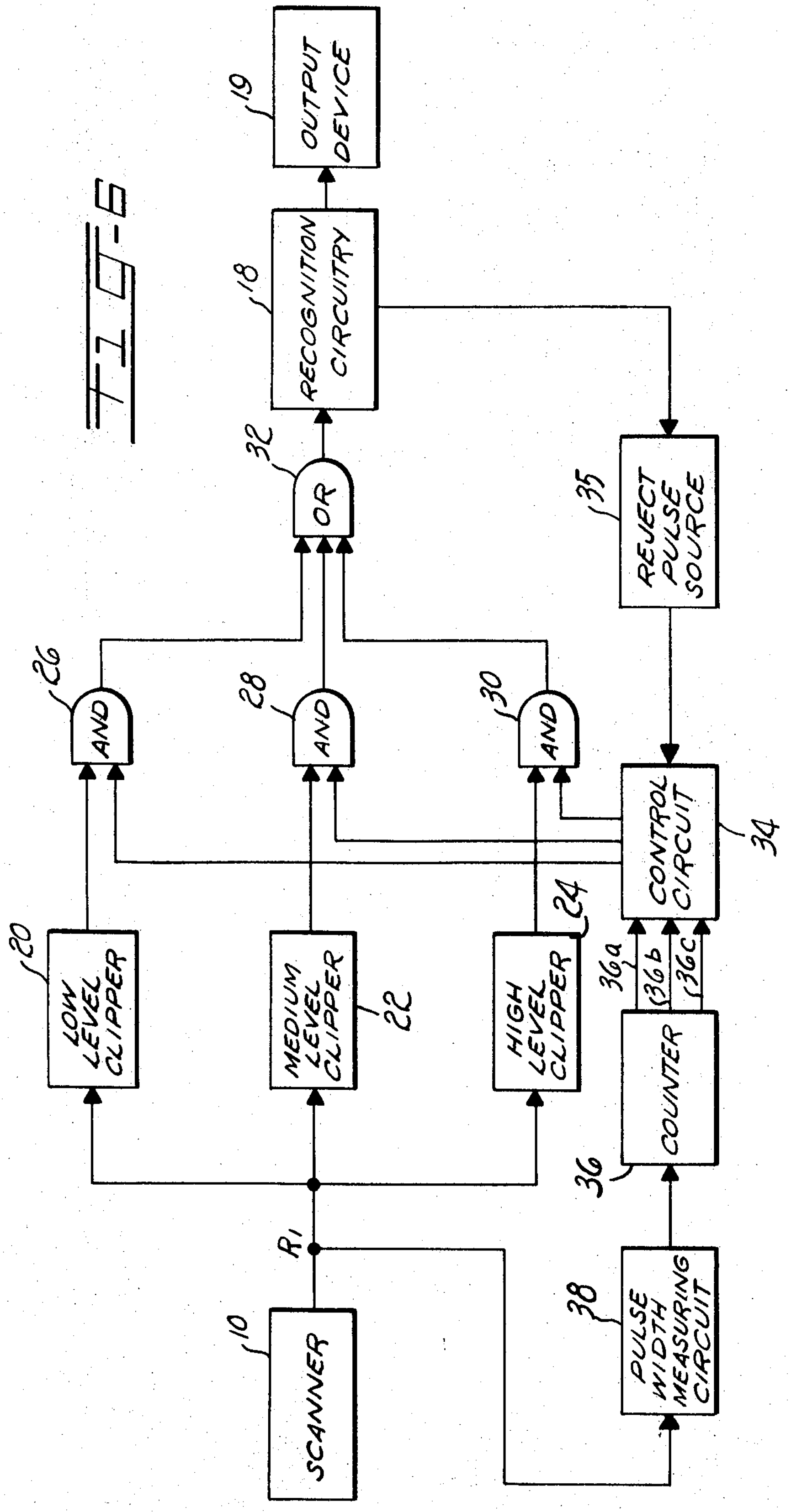
FIG. 6 is a block diagram of one illustrative embodiment of the invention.

Reference should now be made to FIG. 6 which illustrates in block diagram form a system for effectuating the desired solutions discussed hereinbefore. The recognition pulses $R_1$ are once again developed at the output of the scanner 10 and applied to three clipping circuits 20, 22 and 24, the levels of which are respectively low, normal or medium, and high. It is, of course, understood that a greater or lesser number of clipping circuits may be employed depending on the degree of control to be exercised over the reader operation. Outputs of the clippers are respectively connected to AND gates 26, 28 and 30. The AND gates, in turn, are connected to OR circuit 32 which in turn is connected to the recognition circuitry 18. Control circuit 34 determines which of the AND gates 26 through 30 is to be conditioned and thus determines which one of the clipping circuits 20 through 24 is to be actuated. Hence, the above arrangement effectively acts as a variable level clipping circuit, the level being controlled in a manner to be described hereinafter. Also applied to control circuit 34 are the outputs of a special counting circuit 36 over lines 36*a*, 36*b*, and 36*c*, the purpose of counter 36 being to determine or measure the print density, which may be either low, medium or heavy. Control circuit 34 is also responsive to a reject control signal which is generated by reject pulse source 35 in a manner well known to those of ordinary skill in this art. Source 35 is conditioned by recognition circuitry 18 whenever it fails to recognize a character as one of the font or fonts for which circuitry 18 is designed.

As stated hereinbefore FIGS. 3A and 5A respectively correspond to low and heavy print densities while FIGS. 2A and 4A correspond to medium print densities. Counter 36 measures those recognition pulses $R_1$ which exceed a predetermined standard corresponding to short vertical lines as established by pulse width measuring circuit 38. The use of pulse width measuring circuits to establish the presence of features within characters such as short vertical strokes or lines are well known to those of ordinary skill in the art, a pulse width circuit suitable for use with this invention being illustrated at FIG. 18 of U.S. Pat. No. 3,523,280 granted to D. H. Shepard et al. on Aug. 4, 1970 and assigned to the assignee of the present application. As will become more evident hereinafter, the general principle upon which the counter 36 and the measuring circuit 38 operate is based upon the fact that the heavier the printing density, the thicker the strokes comprising the characters. Hence, broadly speaking, counter 36 and measuring circuit 38 act together as a means for measuring print density and more specifically these two components act together as a means for measuring thickness of the character strokes to thereby measure print density.

As will become evident hereinafter, the counter 36 provides an indication as to the number of successive scanning frames containing at least one short vertical stroke exceeding some predetermined standard short vertical stroke. This is illustrated with respect to FIGS. 4A and 5A, where the numeral 7 of FIG. 4A (printed with medium print density) has a stroke width such that four of the vertical scan lines (that is scan lines 15—18) intersect the vertical stroke of the character 7. Thus, as will be described in more detail hereinafter, the counter 36 energizes the output line 36*b* to indicate that the detected stroke width is of medium print density. However, the stroke width of the numeral 7 of FIG. 5A (printed with heavy print density) is such that short vertical strokes will be detected in the successive scans 14a—18, the total number being five. Thus, counter 36 of FIG. 6 will cause output line 36*c* thereof to be energized, thereby indicating heavy print density. Depending on which of the lines 36*a*—36*c* are energized, the control circuit 34 of FIG. 6 will respectively condition one of the AND gates 26—30 to thereby activate one of the clippers 20—24.

Figure 7:
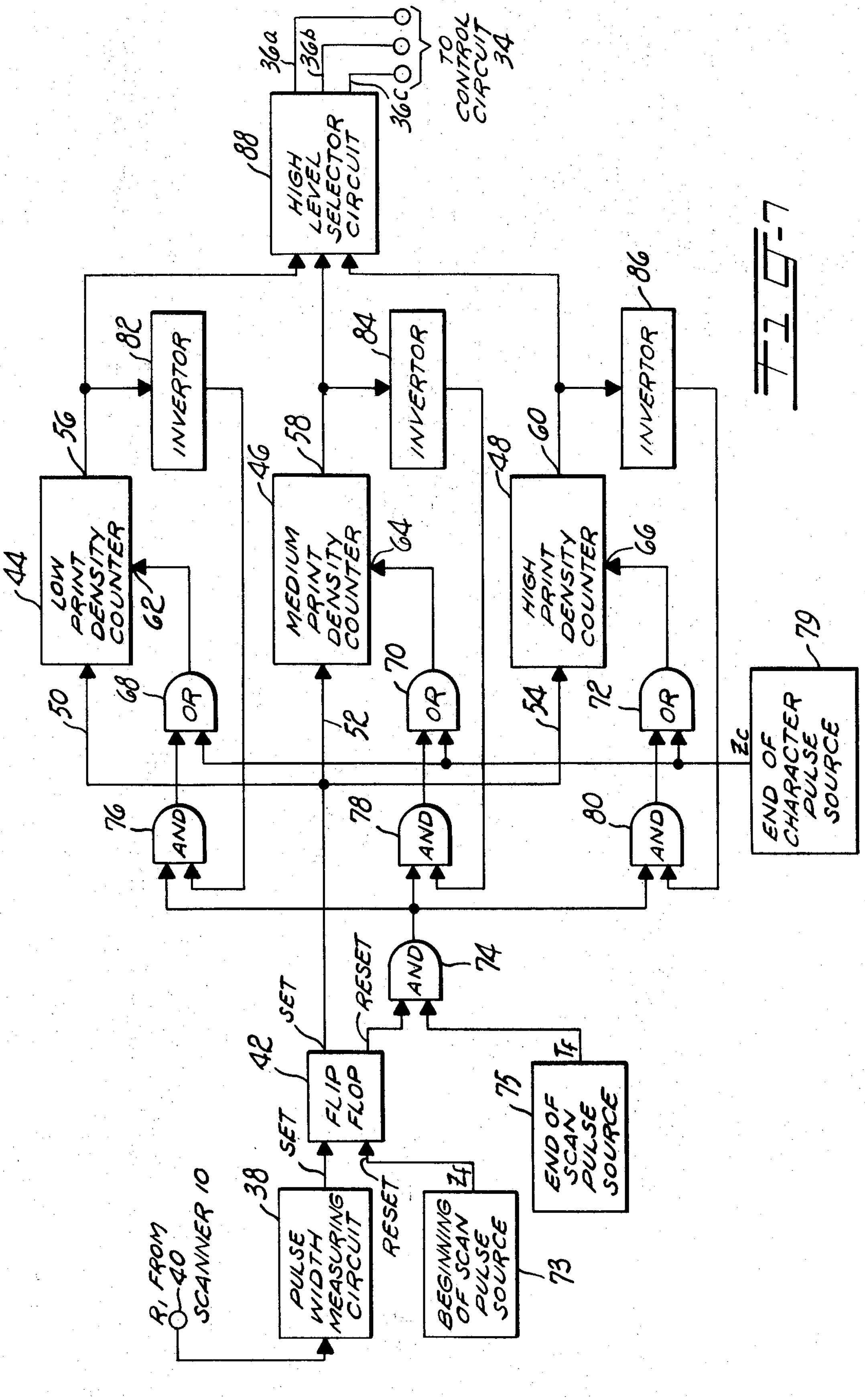
FIG. 7 is a block diagram of an illustrative embodiment of the counter 36 of FIG. 6.

Reference should now be made to FIG. 7 which illustrates in detail the counter 36 of FIG. 6. The recognition pulses are applied via terminal 40 to measuring circuit 38, which in turn determines whether the width of the recognition pulses exceeds the above mentioned predetermined standard. The output of measuring circuit 38 is connected to the SET terminal of flip-flop 42. The SET output terminal of flip-flop 42 is connected to the input terminals of counters 44—48 over lines 50—54. The counters 44 typically are analogue voltage integrators, which, of course, may act as digital counters. Other types of digital counters may also be employed in place of the analogue integrators. The counters 44—48 respectively include output terminals 56—60 which indicate that a predetermined count or voltage level has been reached. Counters 44—48 respectively correspond to low, medium, and heavy print density indications. It is, of course, understood that a greater number of counters may be employed if a greater resolution of the measured print density is required. Thus, terminal 56 of counter 44 will be energized when the counter contains a count indicative of a low print density, this count corresponding to the maximum count for counter 44; terminal 58 will be energized whenever counter 46 contains a count indicative of a medium print density, this count corresponding to the maximum count for counter 46; and terminal 60 will be energized whenever counter 48 contains a count indicative of a heavy print density, this count corresponding to the maximum count for counter 48.

As stated above, at least one pulse must occur for each of a given number of successive scanning frames, the pulse width exceeding some predetermined standard before an indication can be generated as to whether the print density is low, medium, or heavy. Thus, after flip-flop 42 has been set for a given scanning frame, it will be reset at the beginning of the next scan by the reset pulse $Z_f$ which is applied to the RESET terminal thereof. Assuming a short vertical pulse of appropriate width energizes measuring circuit 38 during the next scan, flip-flop 42 is again set to thereby further increment the counters 44—48. Further, assuming that enough successive scans contain short vertical pluses of sufficient width to successively energize the output of measuring circuit 38, terminal 56 of counter 44 will be energized and will remain energized until the end of the particular character. The same applies for terminals 58 and 60 of counters 46 and 48 respectively, as will now be shown. The reset terminals 62—66 of counters 44—48 respectively are connected to OR circuits 68—72 respectively. A pulse which occurs at the end of each character ($Z_c$) and which is generated by means well known to those of ordinary skill in this art, is applied to OR circuits 68—72, the means being indicated at 79. Thus, each of the counters 44—48 will be reset at the end of each character by pulse $Z_c$. However, they may also be reset prior to the character's end whenever (1) a scanning frame occurs, in which there is contained no pulse of sufficient width to energize measuring circuit 38 and (2) any of the counters 44—48 has not reached a level or count sufficient to energize its respective output terminal. The foregoing is accomplished with the following circuitry in a manner to be described hereinafter. Flip-flop 42 is reset by a reset pulse ($Z_f$) produced by source 73 at the beginning of each scanning frame in a manner well known to those of ordinary skill in the art. The RESET output terminal of flip-flop 42 is connected to one of the inputs of AND circuit 74, the other input terminal being connected to a pulse source, which produces a pulse at the approximate end of each scanning frame ($T_f$) in a manner also well known to those of ordinary skill in this art. The output of AND circuit 74 is connected to AND CIRCUITS 76—80 while also respectively connected to these circuits are the output terminals 56—60 of counters 44—48 through inverters 82—86, respectively.

To illustrate the operation of the foregoing circuitry of FIG. 7, reference is made to FIG. 2A, it being assumed that a count of 3 will energize terminal 56 of counter 44; a count of 4 will energize terminal 58 of counter 46, and a count of 5 will energize terminal 60 of counter 48. Scan 15 of FIG. 2A will cause a recognition pulse $R_1$ to be applied to measuring circuit 38, the width of the pulse being of sufficient magnitude to energize the output of circuit 38 and thereby set flip-flop 42 which in turn causes each of the counters 44—48 to have registered therein a count of 1. Scan 16—18 of FIG. 2A will further increment the counters 44—48 until the end of scan 18 at which time counter 44 will contain a count of 3 (which occurs after scan 17 and which is the maximum containable by counter 44) while counters 46 and 48 will each contain a count of 4. Further, the terminals 56 and 58 will be energized while terminal 60 will not be energized. As can be seen in FIG. 2A, scan 19 does not intersect the printed numeral and thus the flip-flop 42 is not set during this scan. Hence, the AND circuit 74 will be energized at the end of the 19th scan when $T_f$ occurs since the RESET terminal of flip-flop 42 will also be energized at this time. As stated hereinbefore, the output of AND circuit 74 is applied to AND circuits 76—80. However, AND circuits 76 and 78 will not be energized because the respective outputs from inverters 82 and 84 will not be energized, this, in turn, resulting from the respective energization of terminals 56 and 58. AND circuit 80 will be energized, however, because terminal 60 of counter 48 is not energized thereby causing a pulse to be applied through OR circuit 72 to reset terminal 66 of counter 48. Hence, shortly prior to the application of the $Z_c$ reset pulse, the counters 44—48 will, thus, contain respective counts of 3, 4, and 0. The high-level selector circuit 88 acts on the outputs 56—60 slightly prior to the occurrence of the $Z_c$ pulse by means (not shown) to select that terminal having the highest voltage level or count associated therewith, the details of circuits, such as selector circuit 88 being well known to those of ordinary skill in the art. Hence, in the example chosen, output line **36*b* will be energized since the voltage level or count associated with terminal 58 of counter 46** was the greatest compared to the other counters.

In the example chosen, the low, medium, and heavy print densities were respectively assigned counts of 3, 4, and 5. Although this particular assignment has proved successful in a working embodiment of the invention, assignment of other counts is also possible and generally speaking the count assigned to medium print density counter 46 would be N while the counts assigned to low and heavy print density counters 44 and 48 would respectively be N—M and N+P where the values of N, M, and P would be determined in a particular application with respect to the paper, ink, font, and scan density utilized.

Having described in detail the structure of the invention the operation thereof will now be given. Referring to FIG. 6, the operation of the reader is such that an attempt is made by the recognition circuitry 18 to recognize the character scanned by scanner 10. If the recognition operation is successfully performed, the recognition circuitry applies an appropriate signal to output device 19 to indicate that the recognition function has been successfully completed. However, if the recognition attempt ends in failure, the character is rescanned in a well known manner a predetermined number of times in order that any mistakes occurring in the original scan of the character might be overcome. Typically, in prior art devices, the rescanning function takes place without any adjustment of the character reading device. However, as stated hereinbefore, it is a purpose of this invention to provide appropriate adjustment during the rescans to thereby compensate for print densities which may affect the recognition operation.

Thus, at the beginning of the reader operation the control circuit 34 is necessarily set by means not shown to select the medium level clipper 22, it being assumed at the beginning that the print density is of medium value.

Assume that the first character scanned by scanner 10 is that of FIG. 2A, it having been stated hereinbefore that this character is of normal print density. Thus, the print density measuring circuit comprising counter 36 and measuring circuit 38 will cause line **36*b* to be energized in a manner described hereinbefore. Further, since the medium level clipper has been activated, the recognition circuitry 18** will be responsive to the clipper output pulses to correctly perform the recognition function and thus no compensation will occur.

In many applications, it is likely that substantially all of the characters in the area of the document corresponding to that of FIG. 2A will also be of normal or medium print density and thus the reader of FIG. 6 will continue to correctly perform the recognition function without any compensatory adjustments being made thereto. For example, in applications involving journal tapes, the print density typically gradually changes from a medium to a low value. Thus, when counter 36 commences to detect characters of low print density it will cause line **36*a* to be energized, however, it may well be that even though the printing of a low print density has been detected, the recognition circuitry may still continue to operate correctly and thus the medium level clipper 22 will be continued to be selected by control circuit 34** even though a low-level print density has been measured for the printed characters. However, the print density measurements are preferably so adjusted that a change in measured print density corresponds to that point where an adjustment should be made to the clipping level to thereby optimize the reader performance.

When the reject pulse source 35 is energized by recognition circuitry 18 because of a failure to recognize a given character, the control circuit 34 will deenergize AND gate 28 and energize AND gate 26 in response to the pulse generated by source 35 and the control signal applied over line **36*a* from counter 36. Thus, during the first rescan of the character, the low-level clipper 20 will be activated to process the raw video signal produced by scanner 10**. Hence, the compensating action described hereinbefore takes place.

Typically, in journal tape applications the print density is initially of a high value and it decreases in value with increasing distance along the tape away from the high print density characters. However, in other applications the print density may vary on a rather irregular basis. Thus, the control circuit may switch directly from the low-level clipper to the high-level clipper or vice versa. Hence, it can be seen that this invention provides a wide degree of versatility and adaptability in compensating for the various degrees of print density encountered in many types of printing applications.

Figure 8:
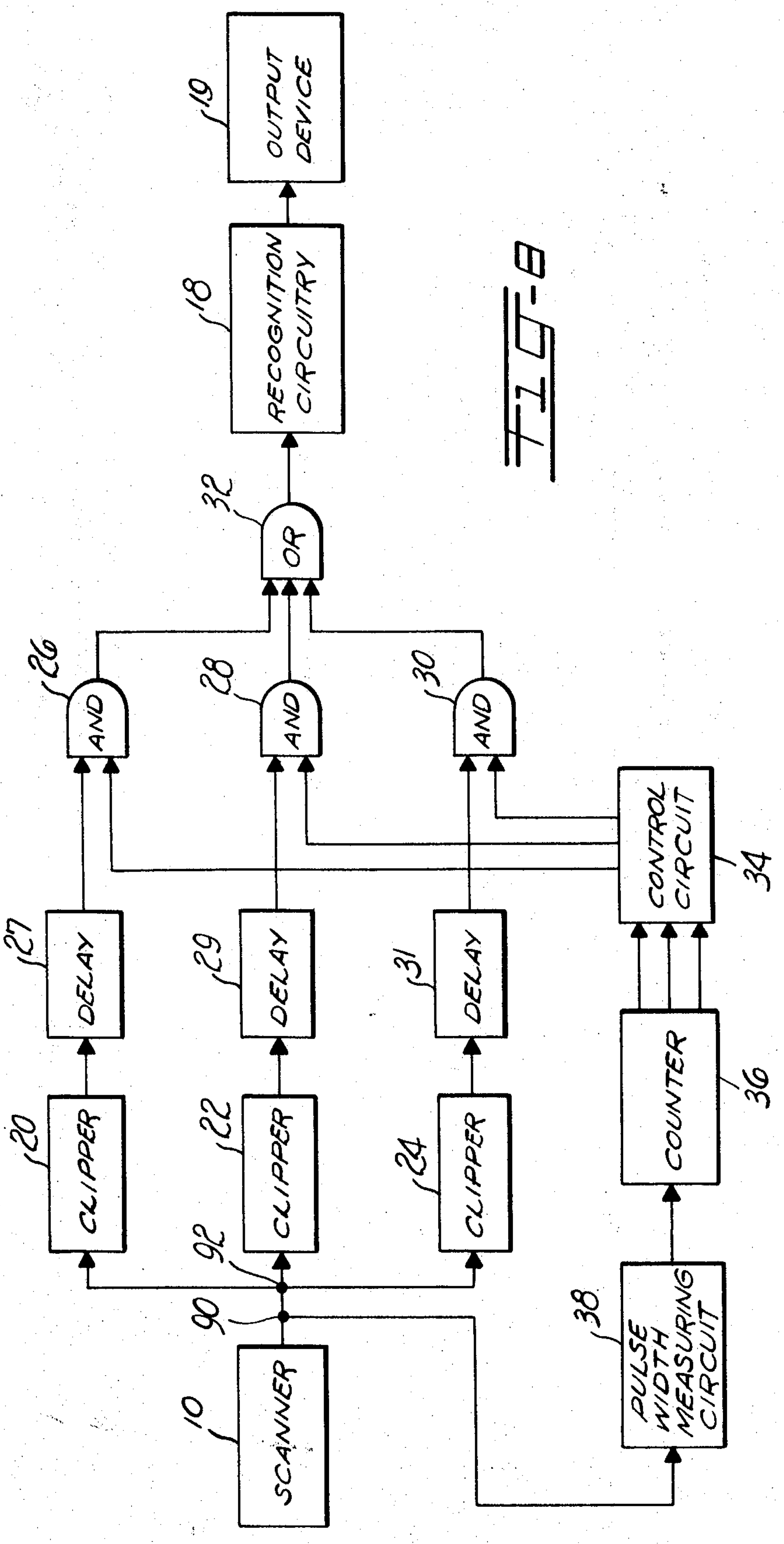
FIG. 8 is a block diagram of a further illustrative embodiment of the invention.

In a further embodiment of the invention, it is not necessary to wait until rescans of rejected characters occur. Referring to FIG. 8, there are three delay lines, 27, 29, and 31, which are inserted between clippers 22—24 and AND circuits 26—30 respectively, although they may be inserted any where in the clipping channel as opposed to the print density measuring channel. Thus, a single delay may also be inserted between the terminals 90 and 92 of FIG. 8. Each delay line has a delay approximately equal to the time required to scan a character and thus the control circuit 34 would select one of the AND circuits 26—30 only after a determination had been made by counter 36 that the print density for the character just scanned was of a given value. Thus, one of the clippers 20—24 would be selected only after the decision had been made as to the print density of the scanned character. Hence, document throughout time can be significantly reduced by avoiding the necessity for rescanning the characters in many instances.

The print density measuring circuitry of the invention has been described in terms of measuring the stroke widths of vertical lines which, in turn, are measured by counting the number of successive vertical scanning frames in which at least one short vertical stroke occurs, it will be understood by those of ordinary skill in this art that other techniques may be employed to measure the width of the horizontal or slanted strokes. Further, the print density measuring circuit may measure vertical, slanted, and horizontal stroke widths or any combination of these to effectuate a final determination as to the print density of the character. Generally, the accuracy of the print density measurement is enhanced by measuring the stroke width of not only the vertical lines but lines of other orientations also. However, in many applications, such as journal tape reading the print density measuring technique described hereinbefore has proven more than adequate.

Numerous other modifications of the invention will become apparent to one of ordinary skill in the art upon reading the foregoing disclosure. During such a reading it will be evident that this invention provides a unique adjustable character reader for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

What I claim is:

1. A character reader for reading characters of variable print density, said reader comprising:

scanning means for generating a series of raw video pulses corresponding to the shapes of the characters scanned by the scanning means;

clipping means, the clipping level of which is adjustable, said clipping means being responsive to said raw video pulses for developing quantized video pulses;

recognition means responsive to said quantized video pulses for distinguishing various combinations thereof to thereby discriminate the characters from one another and effectuate the recognition thereof;

print density measuring means for determining the stroke width of the scanned character, said measuring means being responsive to said raw video pulses to thereby control said adjustable level clipping means in accordance with the print density measured and said print density measuring means counting the number of successive scanning frames in which at least one short vertical stroke occurs, said short vertical stroke having a length which is at least greater than the nominal stroke width of said characters:

whereby the operation of the character reader is compensated for in accordance with the varying degrees of print density encountered by the reader.

2. A reader as in claim 1 including means responsive to said recognition circuitry for generating a reject control signal whenever said recognition means fails to recognize a character processed thereby; and control means responsive to said print density measuring means and said reject control signal source to select said clipping level of the clipping means.

3. A reader as in claim 1 including delay means for delaying the signal in the clipping means channel for a length of time equal to at least the amount of time required for the scanning means to scan one of the characters;

whereby the selection of the clipping level is effectuated after the print density measurement has been made by the print density measuring means.

4. A reader as in claim 1 where said print density measuring means measures the width of vertical strokes occurring in the characters.

5. A reader as in claim 1 where said counting means includes a plurality of counters respectively corresponding to different print densities; and control means responsive to said plurality of counters to control said adjustable level clipping means.

6. A reader as in claim 5 where said clipping means comprises a plurality of clippers respectively associated with said plurality of counters, the clipping levels of said clippers respectively corresponding to said different print densities whereby the selection of one of said counters by said control means causes the corresponding one of said clipping means to be selected.